United States Patent [19]
Hedges et al.

[11] Patent Number: 6,153,245
[45] Date of Patent: Nov. 28, 2000

[54] PROCESS FOR SHAPING FISH AND PRODUCTS THEREOF

[75] Inventors: Nicholas David Hedges; Robert Hurling, both of Bedford, United Kingdom

[73] Assignee: Gorton's Division of Conopco, Inc., Gloucester, Mass.

[21] Appl. No.: 09/094,326

[22] Filed: Jun. 9, 1998

[30] Foreign Application Priority Data

Jun. 11, 1997 [EP] European Pat. Off. ............. 97304059

[51] Int. Cl.⁷ ........................................... A23P 1/00
[52] U.S. Cl. ............................................ 426/513; 426/524
[58] Field of Search .................... 426/512, 513, 426/524

[56] References Cited

U.S. PATENT DOCUMENTS

| | | | |
|---|---|---|---|
| 4,260,640 | 4/1981 | Hartmann et al. | 426/516 |
| 4,708,055 | 11/1987 | Matsumoto et al. | 426/513 |
| 5,273,484 | 12/1993 | Roger et al. | 426/513 |
| 5,470,596 | 11/1995 | Jones | 426/512 |

FOREIGN PATENT DOCUMENTS

| | | |
|---|---|---|
| 2 145 730 | 2/1973 | France . |
| 7225720 | 2/1973 | France . |
| 72/4320 | 11/1972 | New Zealand . |
| 2 280 869 | 2/1995 | United Kingdom . |

OTHER PUBLICATIONS

International Search Report in the application of PCT/EP 98/03493 dated Nov. 5, 1998.

Derwent abstract of FR 2 145 730.

European Search Report in the application of Euopean Patent Application 97304509 dated Oct. 31, 1997.

*Primary Examiner*—George C. Yeung
*Attorney, Agent, or Firm*—James J. Farrell

[57] ABSTRACT

A process for shaping a fish product comprises the steps of: a) placing a portion of frozen fish at a temperature of less than or equal to −5° C., which portion comprises myotomes (2,4), in a device for shaping; and b) applying pressure to the shaping device to shape the fish; wherein the process causes substantially no intra-myotome deformation of the fish.

10 Claims, 5 Drawing Sheets

PROCESS FOR SHAPING FISH AND PRODUCTS THEREOF

FIELD OF THE INVENTION

The present invention relates to a process for shaping fish, particularly into three-dimensional shapes, and to products of the process.

BACKGROUND ART

In the fish industry, fresh fish are filleted and the fillets are tightly packed in cartons and bulk frozen. Frozen blocks of compressed fillets are formed which are processed into consumer-sized portions, usually by sawing the block into cuboids. After cooking by the consumer, these portions have a desirable flaky texture.

However, cuboid portions of frozen fish are not attractive to consumers, as they appear processed or non-natural looking. Hence, processes for shaping portions of fish have been developed, to impart attractive and more natural looking three-dimensional shapes to cuboid fish products, thereby giving a less manufactured appearance.

In GB 2280869, cuboid portions of frozen fish are shaped using high pressure forming. A cuboid portion of frozen fish is placed in a shaped form die and a corresponding shaped upper tool is closed onto the portion in the die and forced therein under hydraulic pressure. The force exerted causes the frozen portion to flow into the cavity in the upper tool, thus taking up the shape of the tooling, both in profile and in the form of the topography of the inside of the surface of the upper tool.

Alternative methods for providing shaped fish products are disclosed in U.S. Pat. No. 5,470,596 and U.S. Pat. No. 4,260,640.

In U.S. Pat. No. 5,470,596, a three-dimensional food product is formed from a flowable, pumpable, raw food material, such as fish, by pumping the material into a mould under pressure.

In U.S. Pat. No. 4,260,640, deep frozen fish is moulded by extrusion under high pressure. The process parameters of pressure and temperature are critically observed to avoid substantial degradation of the structure of the fish.

FR 7225720 discloses a method of moulding fish products to have a natural shape, in which a non-planar moulding surface is used to mould a fish portion. It is mentioned that the fish portion may not completely fill the mould. Moulding is carried out at a temperature in the range −4.5° C.—−3.5° C.

Fish muscle comprises myotomes (flakes). Myotomes comprise fibres having a typical diameter of 30 to 200 microns. These fibres comprise myofibrils having a typical diameter of 1 to 2 microns. Myofibrils are built up of many sarcomeres aligned end to end.

Myotomes are connected to each other by myocommata connective tissue, forming myocommata junctions which run in a direction that is approximately 90 degrees to the longitudinal axis of the myotome fibres.

In the methods described above, the shear resulting from pumping, extrusion or high pressure moulding is sufficiently high to cause significant disruption to the fish muscle structure, such that the fibre arrangement is disrupted and the muscle sarcomere structure is deformed. This results in a fish product which has inferior sensory properties, as a result of loss of flakiness, increased toughness and reduced juiciness, particularly after several months of frozen storage.

The present invention seeks to provide a process for making a shaped fish product having improved sensory properties, even after several months of frozen storage.

SUMMARY OF THE INVENTION

The inventors of the present invention believe that, during shaping, the deformation pattern of frozen fish muscle is unique because it is multi-phasic.

In the first phase they have found that cracking occurs along the myocommata junctions; in the second phase they have found that the myotomes slide past each other without themselves suffering any substantial intra-myotome deformation; in the third and final phase they have found that intra-myotome deformation occurs, since the myotomes are unable to slide past each other due to lack of physical space within a shaping means such as a mould.

These three phases occur when portions of frozen fish are shaped using traditional moulds, such as those of GB 2280869.

By using a shaping process where the fish is moulded at a temperature less than or equal to −5° C. and is allowed to move with substantially no restraint in at least one dimension, the inventors have found that the third phase of the deformation process can be substantially avoided.

This is advantageous as the inventors have also found that minimising intra-myotome deformation provides a shaped fish product having good sensory properties, even after prolonged frozen storage; the product has a flaky texture comparable to that of an unshaped fish product, and superior to that of shaped fish products manufactured in accordance with the prior art processes mentioned above.

Therefore, according to the present invention, there is provided a pressure-shaped frozen fish product characterised in that the fish has substantially no intra-myotome deformation.

According to another aspect of the invention, there is provided a process for shaping a fish product, the process comprising the steps of:

a) placing a portion of frozen fish at a temperature of less than or equal to −5° C., which portion comprises myotomes, in a means for shaping; and
b) applying pressure to the shaping means to shape the fish; characterised in that the process causes substantially no intra-myotome deformation of the fish.

Control of the dimensions of the initial frozen fish portion and of the shaped frozen fish portion is useful in minimising intra-myotome deformation. Preferably, both the initial portion and the shaped portion have linear dimensions (eg length, width, height) which are greater than the distance between myocommata junctions in the fish. In cod, the distance between mycommata junctions is approximately 10 mm, for example. This distance is also termed the myotome width.

Preferably, the shaping means is configured to allow the fish to move with substantially no restraint in at least one dimension during step b.

The fish is preferably allowed to move with substantially no restraint in two dimensions during step b.

The shaping means comprises at least one moulding surface which is designed to contact and shape at least part of the fish. In one example the moulding surface is shaped to impart a three-dimensional fish fillet shape. In another example the moulding surface is substantially planar.

The fish to be shaped may be any fish. It may be 100% fillet or may comprise fillet and extenders such as fish mince.

Prior to shaping, the portion of frozen fish has substantially no intra-myotome deformation; therefore, a major portion of the fish being shaped is not extruded or minced prior to shaping, although the fish may comprise a minor portion of extruded or minced fish.

In one embodiment, the present invention is achieved by having the shaping means make contact with less than 100% of the total surface area of the fish portion during step b.

For example, a parallelepiped-shaped fish portion is placed in a shaping means comprising first and second moulding surfaces (eg upper and lower moulding surfaces) which contact and shape only two faces of the fish portion (eg the upper and lower faces).

The remaining faces of the fish portion (eg the lateral faces) are able to move without restraint.

A shaping means comprising two opposing moulding surfaces which do not make contact with one another during step b is preferably used.

In a second embodiment, the present invention is achieved by using a shaping means having at least one surface which is movable away from the fish during step b, such that the fish is allowed to move with substantially no restraint in the dimension that the movable surface moves in.

In a third embodiment, the portion of fish is sized relative to the shaping means such that, in at least one dimension, during step b, the surface of the fish does not make contact with the shaping means.

In a fourth embodiment, the fish moves during step b resulting in all of its surface area making contact with the shaping means. However in at least one dimension the fish is allowed to move with substantially no restraint, even though the surface of the fish makes contact with the shaping means; this is because the pressure exerted on the fish by the shaping means is sufficiently low in that dimension to cause substantially no intra-myotome deformation; ie the fish moves under pressure and just touches the shaping means in one or more dimensions.

In accordance with the present invention, shaping conditions are controlled so as to minimise intra-myotome deformation and to maximise inter-myotome slippage. This substantially preserves the natural muscle sarcomere structure.

Temperature control is essential in achieving this.

At freezing temperatures such as −20° C., myotomes are rigid and can slide over each other in the second phase of deformation without any significant intra-myotome deformation. At warmer temperatures, i.e. above −5° C., myotomes are less rigid and so intra-myotome deformation in the second phase is more likely to occur. However, once any intra-myotome deformation occurs in accordance with the third phase, the muscle sarcomere structure is undesirably disrupted, irrespective of temperature.

Thus, in the present invention, the portion of frozen fish is shaped when it has a temperature of less than or equal to −5° C., preferably from −10 to −25° C., more preferably from −15 to −20° C.

The temperature of the fish must be less than or equal to −5° C. at all times during the moulding process to avoid intra-myotome deformation.

Methods for determining the level of intra-myotome disruption include visualisation techniques.

DETAILED DESCRIPTION OF THE INVENTION

Examples of the processes and products of the invention will now be described to illustrate, but not to limit, the invention, with reference to the accompanying figures, in which:

FIG. 1 is an optical microscopy image of uncompressed fish muscle tissue (magnification=4) at −15° C., FIG. 2 is an optical microscopy image of partially compressed fish muscle tissue during the compression (magnification=4) at −15° C., FIG. 3 is an optical microscopy image of partially compressed fish muscle tissue after the compression (magnification=4) at −15° C., FIG. 4 is a transmission electron microscopy image of uncompressed fish muscle tissue (magnification=20,000) at −15° C., FIG. 5 is an transmission electron microscopy image of partially compressed fish muscle tissue (magnification=20,000) at −15° C., and FIG. 6 is a transmission electron microscopy image of compressed fish muscle tissue (magnification=20,000) at −15° C.

EXAMPLE 1

Figure 1:
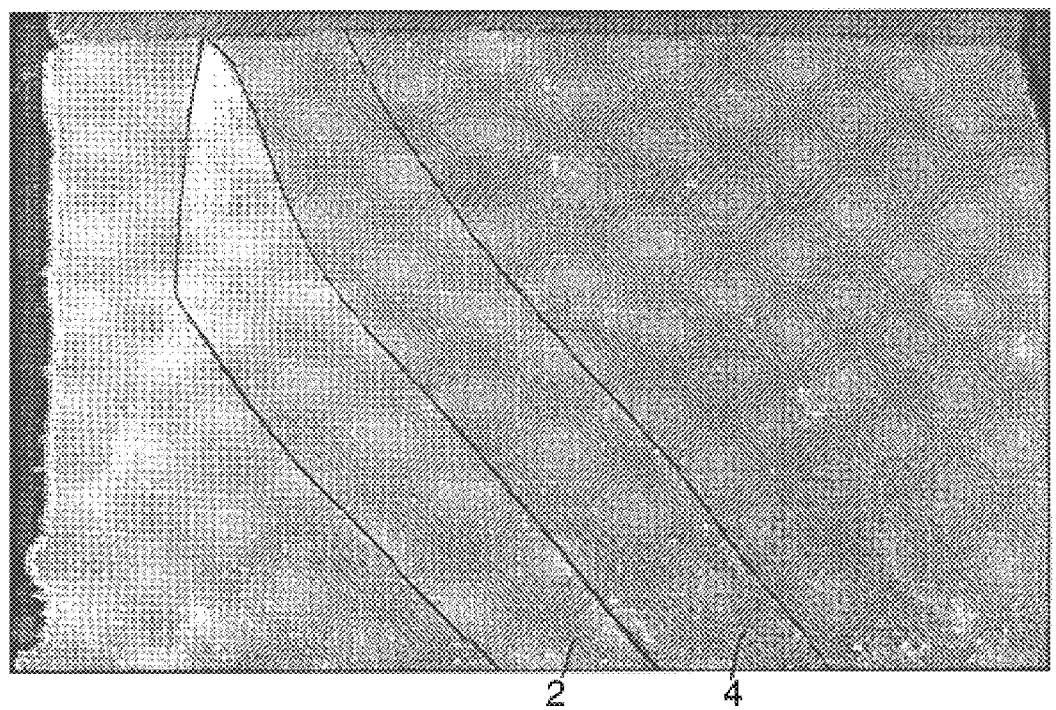
FIGS. 1 to 3 show a plurality of adjacent myotomes; the outlines of two neighbouring myotomes 2 and 4 have been highlighted for clarity.

An optical microscopy image was taken of the muscle tissue of a portion of uncompressed frozen cod which had been tempered to a temperature of −15° C. FIG. 1 is the resulting image: no inter-myotome slippage is visible.

EXAMPLE 2

A portion of frozen cod, having a temperature of −15° C. and a height of 20 mm, was placed between upper and lower moulding plates; these plates were in a cabinet having a temperature of −15° C. Pressure was applied to the plates using a motor which forced them together at a rate of 50 mm/min until the distance between them was 16 mm. Since the plates did not make contact with each other, the fish was able to move laterally without restraint; the resulting fish muscle was partially compressed.

Figure 2:
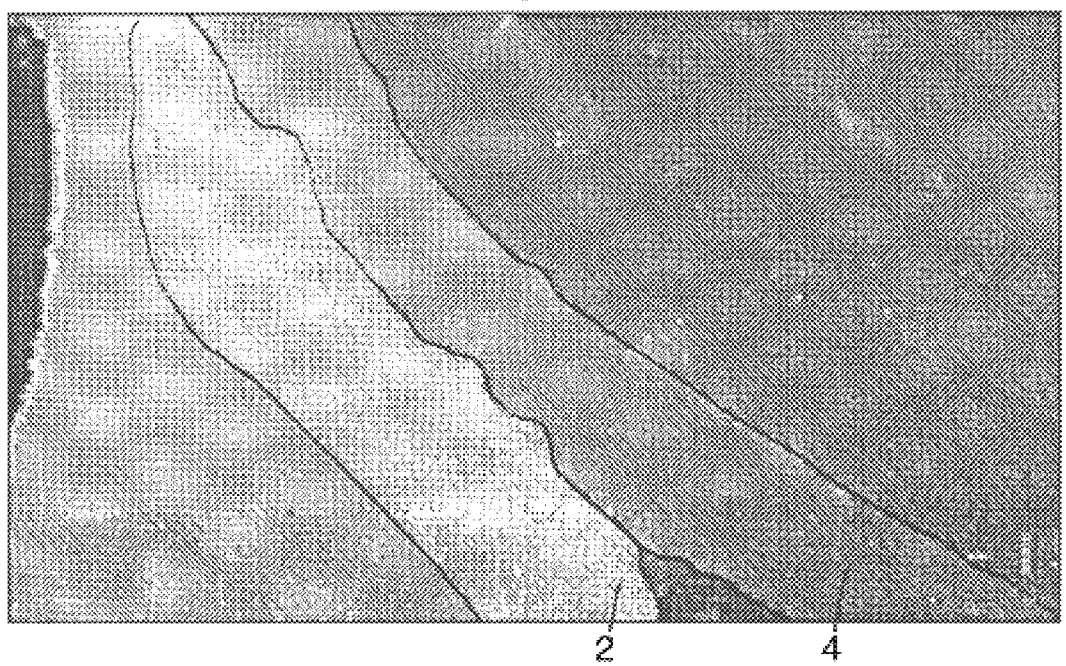
Figure 3:
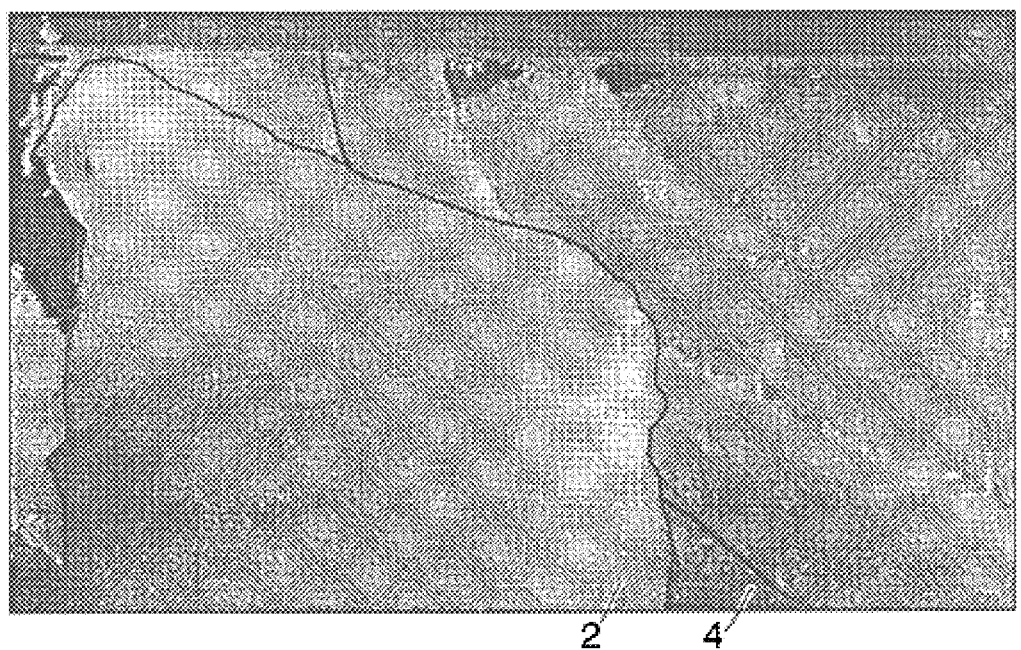

During and after this compression, optical microscopy images were taken of the partially compressed muscle tissue. FIG. 2 is the image taken during the compression. FIG. 3 is the image taken after the compression. These figures show the start of inter-myotome slippage; greater inter-myotome slippage is visible in FIG. 3.

EXAMPLE 3

Figure 4:
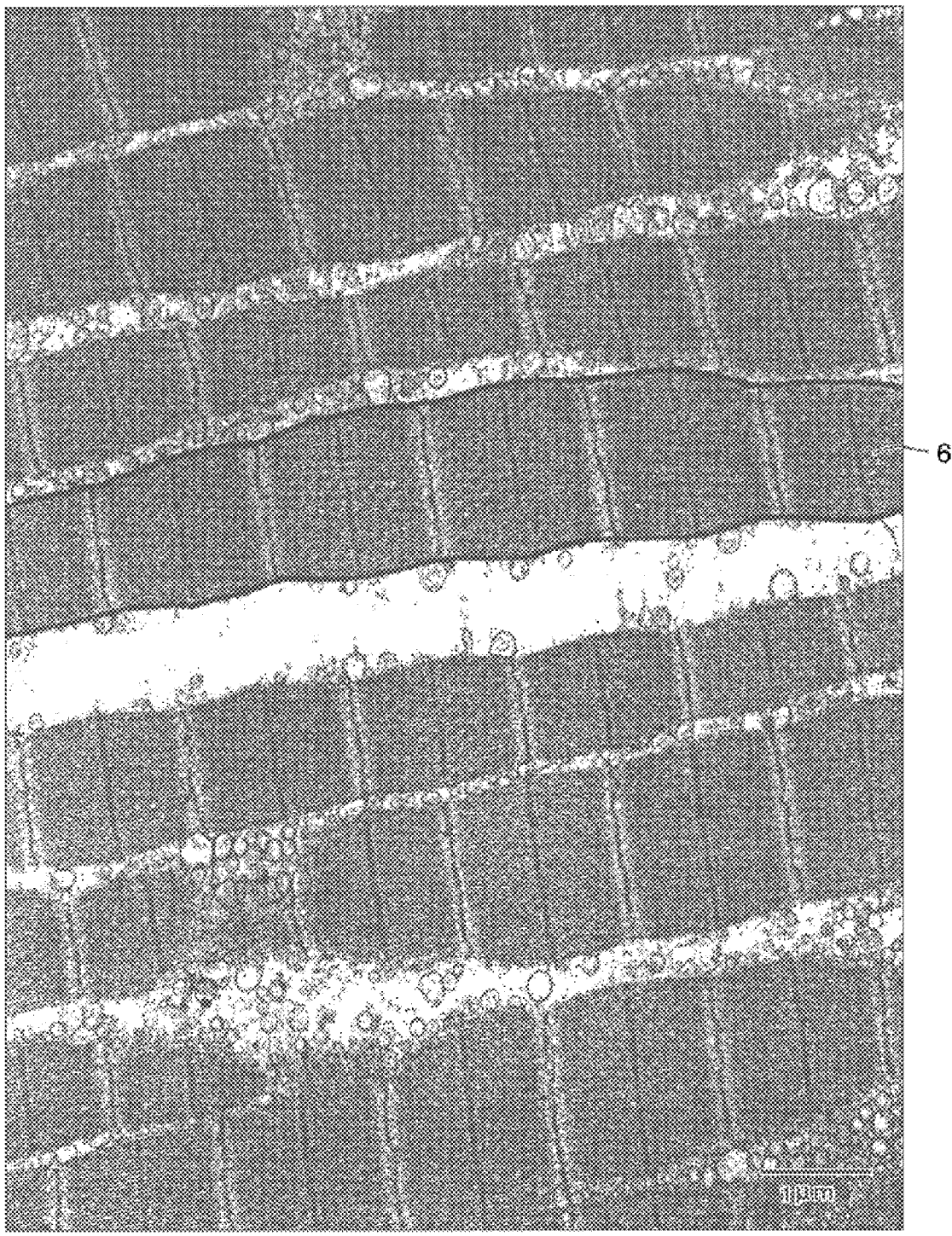
FIGS. 4 to 6 show a plurality of adjacent myofibrils within one myotome; the outline of one myofibril 6 has been highlighted for clarity.

A transmission electron microscopy image was taken of the muscle tissue of a portion of uncompressed frozen cod which had been tempered to a temperature of −15° C. FIG. 4 is the resulting image: no myofibril deformation is visible. This means that the cod muscle had no intra-myotome deformation.

EXAMPLE 4

A portion of frozen cod, having a temperature of −15° C. and a height of 20 mm, was placed between upper and lower moulding plates separated by a distance of 20 mm; these plates were in a cabinet having a temperature of −15° C. Pressure was applied to the plates using a motor which forced them together at a rate of 50 mm/min until the distance between them was 12 mm. Since the plates did not make contact with each other, the fish was able to move laterally without restraint; the resulting fish muscle was partially compressed.

Figure 5:
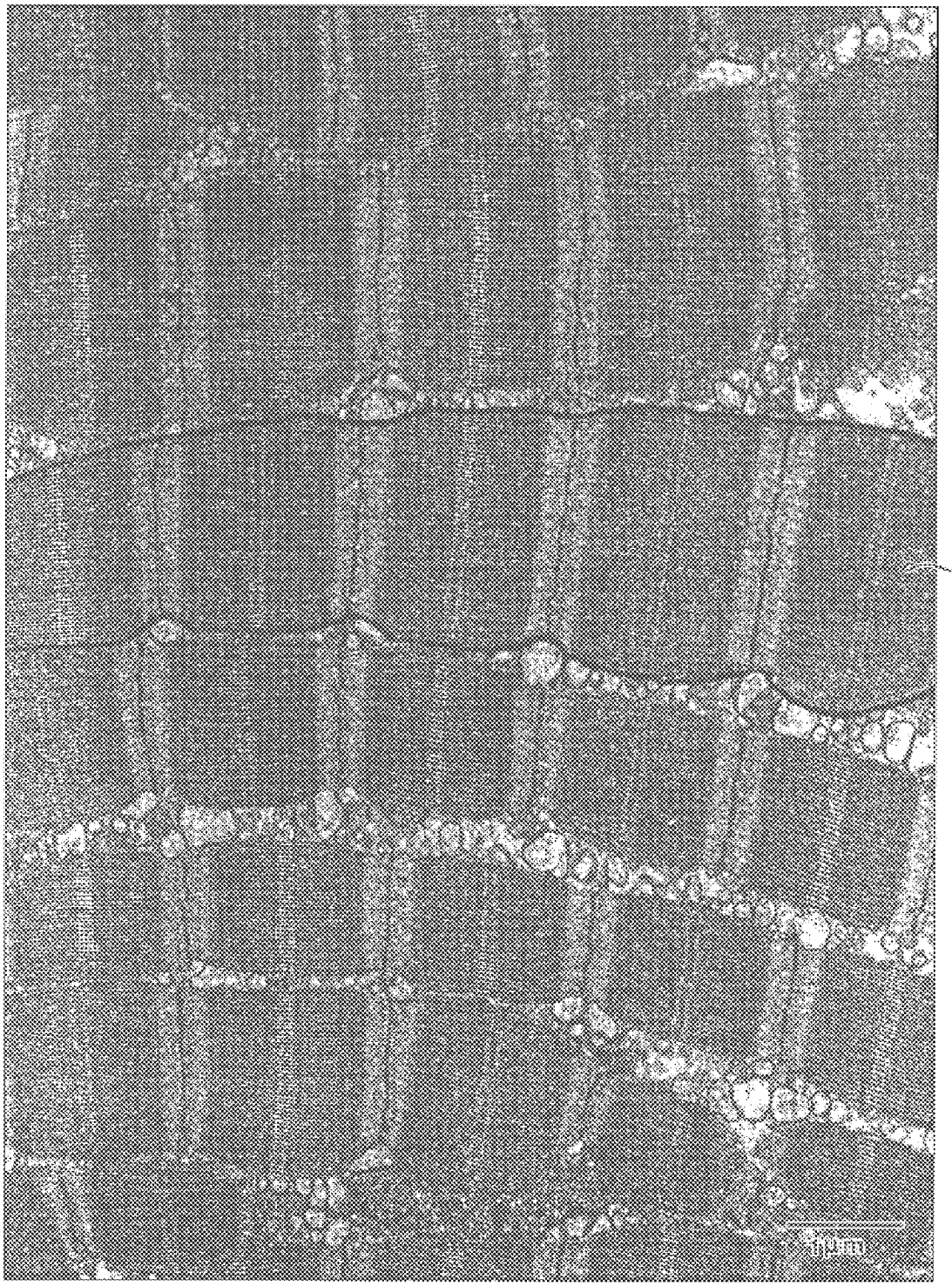

A transmission electron microscopy image was taken of the partially compressed fish muscle. FIG. 5 is the resulting image: no deformation of the myofibrils is visible. This means that the cod muscle had no intra-myotome deformation.

EXAMPLE 5

The method of example 4 was repeated, except that the plates were forced together until the distance between them was 6 mm, resulting in compressed fish muscle.

Figure 6:
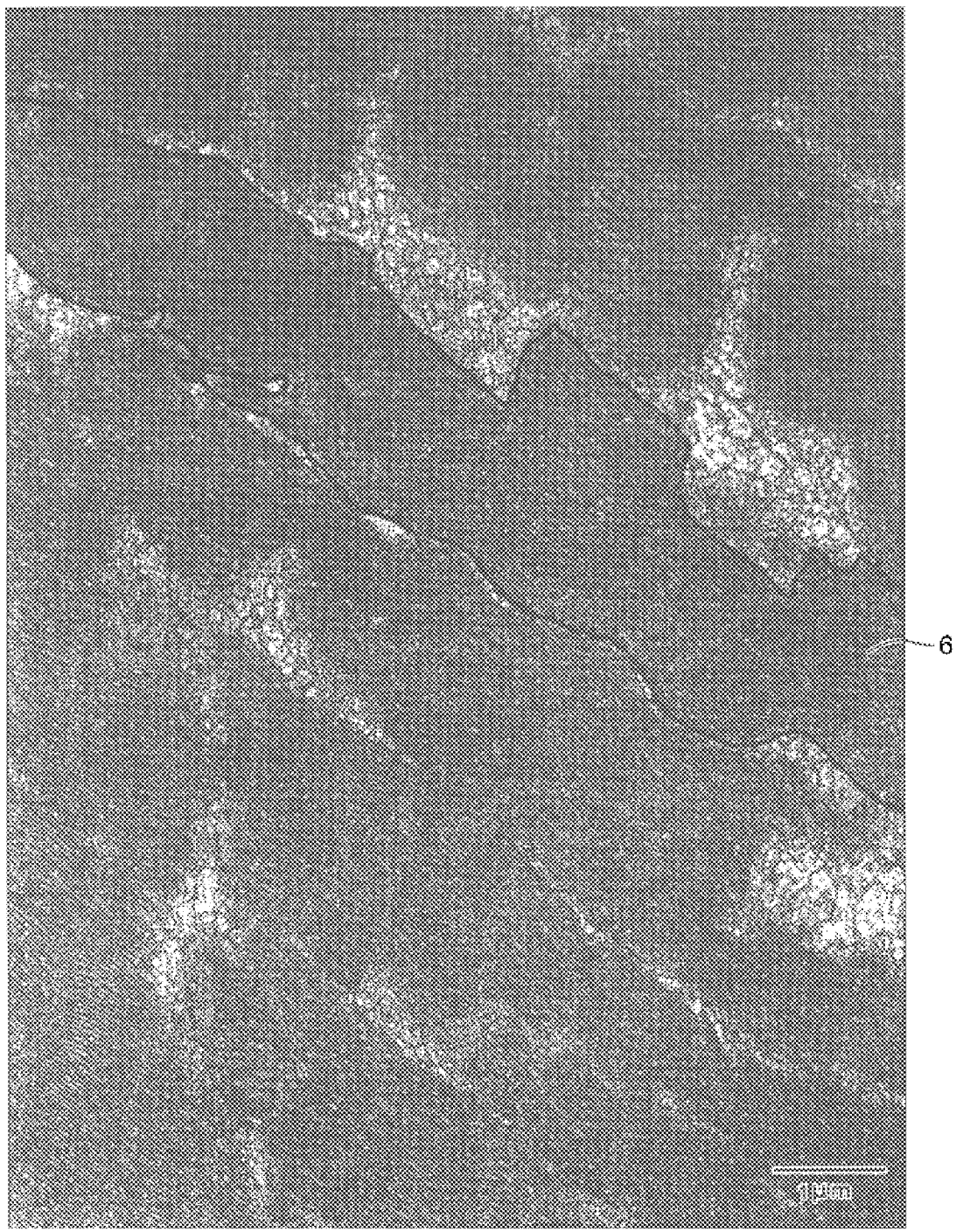

A transmission electron microscopy image was taken of the compressed fish muscle. FIG. 6 is the resulting image: great myofibril deformation is visible. This means that intra-myotome deformation had occurred.

What is claimed is:

1. A process for shaping a fish product, the process comprising the steps of:
   a.) placing a portion of frozen fish at a temperature of less than or equal to −5° C., which portion comprises myotomes, in a means for shaping; and
   b.) applying pressure to the shaping means to shape the frozen fish portion;
   characterized in that the process causes substantially no intra-myotome deformation of the fish.

2. The process as claimed in claim 1, wherein the shaping means is configured to allow the frozen fish portion to move with substantially no restraint in at least one dimension during step b.

3. The process as claimed in claim 1, wherein the frozen fish portion moves during step b resulting in all of its surface area making contact with the shaping means, and wherein the pressure exerted by the shaping means on the frozen fish portion is sufficiently low in at least one dimension to cause substantially no intra-myotome deformation.

4. The process as claimed in claim 1, wherein the shaping means makes contact with less than 100% of the surface area of the fish portion during step b.

5. A process as claimed in claim 1, wherein the shaping means comprises two opposing moulding surfaces which do not make contact with one another during step b.

6. A process as claimed in claim 1, wherein the fish portion is sized relative to the shaping means such that, during step b, the surface area of the fish does not make contact with the shaping means in at least one dimension.

7. A process as claimed in claim 1, wherein the shaping means has at least one surface which is movable away from the fish portion during step b, such that the fish is allowed to move with substantially no restraint in the dimension that the movable surface moves in.

8. A process as claimed in claim 1, wherein the fish portion has a temperature of from −10 to −25° C.

9. A process as claimed in claim 8, wherein the fish portion has a temperature of from −15 to −20° C.

10. A pressure-shaped frozen fish product prepared in accordance with the process claimed in claim 1.

* * * * *